United States Patent [19]

Estabrook

[11] 4,385,906

[45] May 31, 1983

[54] START-UP METHOD FOR A GASIFICATION REACTOR

[75] Inventor: Lawrence E. Estabrook, Whittier, Calif.

[73] Assignee: Texaco Development Corporation, White Plains, N.Y.

[21] Appl. No.: 352,443

[22] Filed: Feb. 25, 1982

[51] Int. Cl.³ .................................................. C10J 3/46
[52] U.S. Cl. ...................................... 48/197 R; 48/212; 48/215; 252/373
[58] Field of Search ............. 252/373; 48/197 R, 212, 48/215, 206

[56] References Cited

U.S. PATENT DOCUMENTS

| | | | |
|---|---|---|---|
| 3,979,328 | 9/1976 | Pockrandt | 48/215 |
| 3,998,609 | 12/1976 | Crouch et al. | 252/373 |
| 4,113,445 | 9/1978 | Gettert et al. | 252/373 |
| 4,235,625 | 11/1980 | Tippmer | 48/206 |

Primary Examiner—Peter F. Kratz
Attorney, Agent, or Firm—Carl G. Ries; Robert A. Kulason; Robert Knox, Jr.

[57] ABSTRACT

A method for starting up a pressurized partial oxidation gas generation system comprising a gas generator and gas purification train without atmospheric pollution. The method comprises isolating and prepressuring the gas purification train to a pressure of at least 50 percent of normal operating pressure, starting the gas generator and autogenously increasing the pressure in the gas generator to the pressure of the gas purification train before establishing communication with the gas purification train to permit flow of gas through the gas purification train. Purified gases discharged from the gas purification train may be burned in a flare without atmospheric pollution.

5 Claims, 1 Drawing Figure

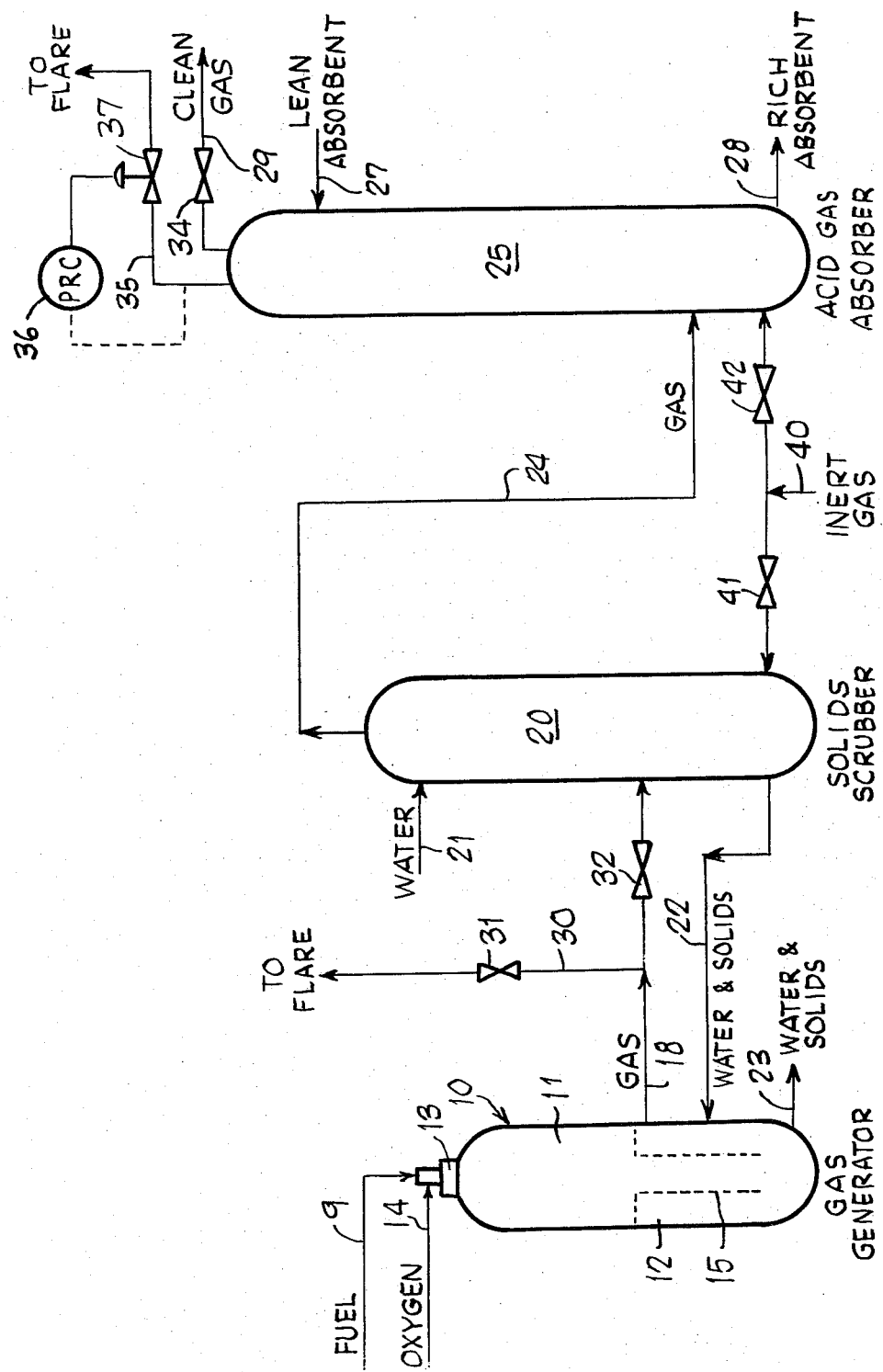

START-UP METHOD FOR A GASIFICATION REACTOR

This invention relates to a method of start-up of a pressurized gasification process. In one of its more specific aspects, this invention relates to a method for the start-up of a partial oxidation gas generation process for the production of fuel gas, or reducing gas, or synthesis gas by partial oxidation of a carbonaceous fuel with an oxygen-containing gas. In another of its more specific aspects, this invention relates to a method for the start-up of such a process wherein the nature of the feedstock to the synthesis gas generator is such that combustion of the gases from the gasification reactor would result in atmospheric pollution.

The present invention permits starting up a relatively high pressure gasification reactor or partial oxidation gas generator and gas purification system comprising a gas purification train designed to operate at relatively high pressure wherein gases produced in the gas generator during the start-up period are passed through the gas purification train and permitted to flare only after deleterious components of the gas stream are removed from the gases in the gas purification system.

Various fossil fuels found in the earth contain components other than hydrogen and carbon. Frequently the fossil fuels contain sulfur compounds in such amounts that their products of combustion result in emission of objectionable amounts of gaseous sulfur compounds into the atmosphere. Petroleum, coke, coal and heavy residua from hydrocarbon refining processes often contain relatively high contents of sulfur and nitrogen compounds. Additionally, some liquid and gaseous fuels, such as natural gas and heavy gas oils or furnace oils contain relatively large amounts of sulfur compounds. Such fuels, while unsuitable for use directly in furnaces, may be processed for the removal of objectionable components. The solid fuels are generally more difficult to process for the removal of undesirable sulfur and nitrogen compounds and are less convenient to transport than are liquid and gaseous fuels.

It is already well known that various carbonaceous fuels may be converted to reducing gas, fuel gas, or synthesis gas comprising carbon monoxide and hydrogen by partial oxidation at an elevated reaction temperature. The partial oxidation of fossil fuels is a highly economic method of producing clean mixtures of carbon monoxide and hydrogen, which have many industrial uses. In these processes, a fossil fuel, for example, coal, coke, oil, or natural gas is reacted with an oxygen-containing gas, usually commercially pure oxygen, in a closed, compact reaction at an autogenous temperature within the range of about 2200° to 3000° F. In the flow type reaction processes, the reaction zone is free from packing and catalyst. Preheated reactants are introduced through a mixer-burner in the upper part of a vertical cylindrical reactor and spontaneously react with one another, optionally in the presence of added steam, to form carbon monoxide and hydrogen. The reaction zone is usually maintained under a pressure above about 100 pounds per square inch gauge and may be as high as 3000 psig; usually the process reaction pressures are in the range of 200 to 1200 psig. Steam may be introduced into the reaction zone to assist in the dispersion of fuel in the reactor. Steam also assists in control of the reaction temperature and acts as a reactant thereby decreasing the amount of free oxygen required in the process. The product gas consists essentially of carbon monoxide and hydrogen together with some water vapor, nitrogen, carbon dioxide and entrained carbonaceous solid or soot. The carbonaceous solid represents a minor proportion, usually of the order of 2 to 3 weight percent, of the carbon contained in the carbonaceous feedstock which is not converted to carbon monoxide and hydrogen in the reactor. The carbonaceous solid is in the form of very fine carbon particles which, upon separation from the gas stream, may be recycled to extinction or sold as a product of the process.

In some installations, a waste heat boiler is interposed between the gas generator and the water quench and wash steps. In the gasification of solid fuels, solid or molten ash or slag is separated from the hot gas stream from the gas generator prior to contacting the gas stream with water.

The amount of oxygen supplied to the gas generation zone is limited so that near maximum yields of carbon monoxide and hydrogen are obtained. Air, oxygen-enriched air or substantially pure oxygen may be employed in the process. Oxygen of high purity may be readily obtained by the rectification of air. Commercial oxygen plants capable of delivering large amounts of high purity oxygen typically produce oxygen streams containing in excess of 98 mole percent oxygen.

The entrained carbon is effectively removed from the product gases by contacting the hot gas from the gas generator with water, cooling the gas streams and removing carbon. In a typical installation of a flow type gas generation process, unconverted carbon or soot is removed from the hot gas stream from the reactor by first contacting the hot gas with water in a quench chamber closely associated with the gas generation reactor. The gas stream from the gas generator may be bubbled through a pool of water after which the gas is washed with additional amounts of water in a gas scrubbing tower. The water quench and wash system cools and simultaneously removes soot and ash from the gas stream. The cooled and partially purified gas is then passed into contact with a suitable scrubbing agent for the removal of hydrogen sulfide and other acid gases in a separate gas scrubbing tower. Acid gases may be removed from the gas stream by any conventional method, typically by contacting the cooled gas in an absorber or gas-liquid contacting tower with a suitable absorbent, e.g. methyl alcohol, hot sodium carbonate, methanolamine, and the like. The synthesis gas generation process is described in detail in U.S. Pat. Nos. 2,701,756; 2,931,715; 3,232,727; and 4,189,207 incorporated herein by reference.

In a conventional start up of a partial oxidation gas generation process, the gas generator is started up at atmospheric pressure and the resulting effluent gas from the gas generator burned in a flare. Once the gas generator is operating satisfactorily, the flow of gases from the gas generator is gradually diverted to the gas purification train to gradually pressurize the system comprising the synthesis gas generator, water wash tower and acid gas scrubber. As the pressure in the system increases, the volume of gases passing from the gas generator to the gas purification system may be increased until full pressure and throughput conditions are reached. It will be understood that the product gas is normally burned at the flare only during the startup period.

It is the purpose of the present invention to provide a procedure by which a partial oxidation gas generator or coal gasifier which normally operates at a relatively high pressure, e.g. a pressure above 200 psig, may be started up in a manner which avoids the necessity for discharging unpurified gases to the atmosphere or to a flare.

The accompanying FIGURE represents diagrammatically apparatus for the generation and purification of gas by partial oxidation of a carbonaceous fuel comprising a gas generator, a solids scrubber, and an acid gas absorber.

The method for starting up and pressurizing the gasification process system as illustrated in the accompanying drawing and described in the following detailed description is by way of a specific example and it is not intended to limit the invention to the particular apparatus or processing procedure described.

With reference to the drawing, a carbonaceous fuel which may comprise gaseous, or liquid or solid carbonaceous fuel, is supplied through line 9 to a gas generator 10 comprising a reaction chamber 11 and a quench chamber 12. The fuel, preheated to the desired extent, is introduced through a mixer-burner 13 into the reaction chamber 11 of the gas generator. Oxygen from line 14 is supplied to burner 13 of the gas generator where it is intimately mixed with the fuel supplied to the burner through line 9. The mixture of fuel and oxygen, optionally including steam, reacts in the reaction zone 11 at an autogenous temperature, typically in the range of about 2200° to 3000° F., and at an elevated pressure, typically in the range of 200 to 1200 pounds per square inch gage, to produce a gas comprising carbon monoxide and hydrogen. The gas as produced typically contains small amounts of soot or carbon, generally in the range of 0.5 to 5 weight percent, typically about 2 to 3 weight percent, of the carbon content of the fuel supplied to the gas generator, together with ash from the fuel.

Hot effluent gas from the reaction zone 11 of the gas generator is discharged through a dip tube 15 into quench chamber 12 into intimate direct contact with water contained therein. A suitable gas generator is described in U.S. Pat. No. 3,998,609, incorporated herein by reference.

Water in the quench zone in the gas generation vessel effects rapid cooling of the gas and at the same time removes most of the soot or carbon and ash contained in the freshly generated gas. Cooling of the hot gas causes a part of the water to vaporize producing steam which may be useful in subsequent processing steps, for example, in the water gas shift reaction, not illustrated.

Cooled gas from the gas generator quench zone 12 is passed through line 18 to a soot scrubber 20 where it is further contacted and scrubbed in countercurrent flow with water introduced into the soot scrubber through line 21. Water containing carbon removed from the gas in the gas scrubber 20 is passed through line 22 to the quench section 12 of the gas generator. A carbon-in-water slurry is withdrawn from quench zone 12 through line 23 for disposal.

Gas free from carbon and enriched in water vapor is withdrawn from soot scrubber 20 through line 24 to an acid gas removal system comprising an acid gas absorber 25. The absorber 25 is preferably provided with packing, baffles, bubble plates, or the like to ensure intimate countercurrent gas-liquid contact between an acid gas absorbent, for example, methanol, introduced into the upper part of absorber 25 through line 27 and gas entering the lower part of the absorber through line 24. In the acid gas absorber 25, the absorbent removes acid-reacting gases including hydrogen sulfide from the gas stream. Rich absorbent containing the acid gases removed in the absorber 25 is withdrawn from the bottom of the absorber tower through line 28. Purified gas is discharged through line 29.

The start-up of a flow type partial oxidation gas generator usually involves preheating the reaction zone of the gas generator at substantially atmospheric pressure by burning a clean fuel gas with oxygen-containing gas and discharging the products of combustion to the atmosphere. As illustrated in the accompanying FIGURE, products of combustion from the gas generator are discharged through line 30 to the atmosphere by opening valve 31, the gases usually going to a flare where combustibles, if present, are burned before being discharged into the atmosphere.

When the high temperature refractory lining of the gas generator reaction zone reaches a temperature of the order of 2000° F., the supply of clean fuel gas to the gas generator is discontinued and the fuel switched over to the desired feedstock, e.g. oil or solid carbonaceous fuel dispersed in steam and optionally preheated to a temperature of from about 300° to about 500° F. Upon entering the preheated reaction chamber 11 of the synthesis gas generator, the fuel spontaneously ignites quickly raising the temperature in the reactor to the normal operating temperature within the range of 2200° to 2800° F. or higher.

During the start-up operation, the gas is customarily vented through vent line 30 and valve 31 to a flare. After the gas generator has been lined out, valve 32 is opened to permit gas from line 18 to enter soot scrubber 20. Valve 34 at the outlet of the acid gas absorber is normally closed during the initial start-up period. Valve 31 is then gradually closed to permit a permissible volume of gases to flow through soot scrubber 20 into acid gas absorber 25, gradually building up pressure within the gas generator and purification train. When the pressure in acid gas absorber 25 has been increased to the desired operating pressure, valve 34 is opened and valve 31 completely closed. The clean synthesis gas flows through line 29 to other processes, not illustrated, which utilize synthesis gas as a feedstock.

This method of starting-up a high pressure gas generator and purification train comprising a solids scrubber and acid gas absorber, while entirely satisfactory, presents a problem when the fuel feedstock to the generator contains sulfur compounds which are converted to hydrogen sulfide in the reaction zone 11 of the gas generator. Gas containing hydrogen sulfide, if discharged through line 30 to a flare, produces sulfur dioxide, a highly objectionable atmospheric pollutant.

In accordance with the method of the present invention, hydrogen sulfide resulting from partial oxidation of sulfur-containing fuels in a gas generator is removed from the raw gas product before the gases are permitted to discharge to a flare. In the case of a high pressure gas generator and gas purification train, the volumes of gas generated at atmospheric or near-atmospheric pressure during the start-up of the gas generator are so large that they cannot be passed through the gas purification train in the normal manner of operation. The volume of gas, and consequently the velocities of the gases passing through the solids scrubber and acid gas absorber 20 and 25, would be so great that water and solids would be carried over from the solids scrubber into the acid gas absorber, and the acid gas absorbent carried out of the acid absorber to the flare. Additionally, there is danger of displacing the packing material from the scrubber tower 20 and the acid gas absorber tower 25 or damaging the perforated plates or bubble trays in these towers.

In accordance with the present invention, a method of starting up the high pressure gas generator and purification train without flaring noxious gases is accomplished by a sequence of steps as follows. With reference to the FIGURE, the gas generator is preheated in the usual manner by burning clean fuel with oxygen-containing gas in the gas generator and venting the products of combustion from the gas generator through line 30 and valve 31 to a flare. When the desired preheat temperature is reached, the supply of fuel gas and oxygen-containing gas is discontinued and valve 31 is closed.

Valves 32 and 34 are closed, isolating the gas purification train from the gas generator. Line 35, from the top of acid gas absorber 25 is provided with a pressure control valve 37. In the embodiment illustrated, a pressure recorder and controller (PRC) 36 is preset to permit valve 37 to open only after the pressure in line 35 and in acid gas absorber 25 reaches a predetermined pressure of the order of 50 to 80 percent of the normal operating pressure of the system. As a specific example, if the desired operating pressure of the gas generator is 500 psig, the PRC 36 may be preset to open valve 37 when the pressure in acid gas absorber 25 reaches 250 psig. A suitable product gas or inert gas, e.g., nitrogen or synthesis gas, from a suitable source, is introduced through line 40 and valves 41 and 42 into soot scrubber 20 and acid gas absorber 25, respectively, until the pressure in these vessels reaches the predetermined set pressure of pressure recorder and controller 36.

After the predetermined pressure in soot scrubber 20 and acid gas absorber 25 is reached, valves 41 and 42 are closed and the fuel feedstock containing sulfur compounds is supplied through line 9, mixed with oxygen-containing gas from line 13, and the mixture introduced into the preheated reaction zone 11 of synthesis gas generator 10. Within a few seconds the pressure in the gas generator 10 increases to a pressure equal to or greater than the pressure in the gas purification train comprising soot scrubber 20 and acid gas absorber 25. When this occurs, valve 32 is opened to permit gas to flow from line 18 into soot scrubber 20 and through line 24 into acid gas absorber 25. Valve 37 is opened by the pressure recorder and controller 36 so that the purified gas may flow through line 35 and valve 37 to a flare, not illustrated, where it may be burned without pollution of the atmosphere with oxides of sulfur. When the gas generation and purification system is operating satisfactorily, valve 34 is opened and valve 37 closed allowing clean product gas to flow through line 29 for utilization as fuel gas, reducing gas, or synthesis gas.

It will be evident from the foregoing description that the method of this invention provides a safe and effective method of starting up a relatively high pressure gas generator operating on sulfur-containing feedstocks without pollution of the atmosphere. It will be understood by one skilled in the art that the FIGURE and the accompanying description, while describing the process generally and the start-up procedure more particularly, omits for the sake of simplicity, numerous safety devices and automatic controls normally associated with high pressure gas generation processes which are known to those skilled in the art and are not essential to the detailed description of this invention.

I claim:

1. A method for starting up a partial oxidation gas-generation system comprising a pressurized gas generator and gas purification train which comprises
   a. isolating said gas generator from said gas purification train,
   b. pressuring said gas purification train with gas to 50 to 80 percent of normal gasification reactor pressure,
   c. heating the gas generator at substantially atmospheric pressure to a temperature at which reaction between fuel and oxygen will take place spontaneously producing a gas mixture comprising carbon monoxide and hydrogen,
   d. introducing sulfur containing carbonaceous fuel and oxygen into said gas generator at a flow rate equivalent to 50 to 100 percent of the normal operating flow rate for said gas generator,
   e. autogenously increasing the pressure in said gas generator to said pressure of said gas purification train, then
   f. establishing communication between said gas generator and said gas purification train whereby gases from said gas generator flow through said gas purification train, and
   g. discharging purified gases from said gas purification train wherein said gas purification train comprises means for water washing gases from said gas generator and means for absorbing acid gases from said water washed gases.

2. A process according to claim 1 in which the pressure in said gas generation and gas purification steps is permitted to build up to the desired operating pressure prior to discharge of gas from said acid gas purification step.

3. A method according to claim 1 wherein said fuel is a solid carbonaceous fuel.

4. A method according to claim 1 wherein said fuel is a hydrocarbon liquid.

5. A method according to claim 1 wherein said fuel is a normally gaseous hydrocarbon.

* * * * *